United States Patent
Ogawa et al.

(10) Patent No.: US 7,656,432 B2
(45) Date of Patent: Feb. 2, 2010

(54) METHOD AND APPARATUS FOR PHOTOGRAPHING MOVING OBJECT

(75) Inventors: Ryota Ogawa, Saitama (JP); Yoshihiro Hama, Saitama (JP); Atsumi Kaneko, Tokyo (JP); Masachika Yamamoto, Saitama (JP)

(73) Assignee: Hoya Corporation, Tokyo (JP)

( * ) Notice: Subject to any disclaimer, the term of this patent is extended or adjusted under 35 U.S.C. 154(b) by 692 days.

(21) Appl. No.: 11/392,743

(22) Filed: Mar. 30, 2006

(65) Prior Publication Data

US 2006/0221229 A1 Oct. 5, 2006

(30) Foreign Application Priority Data

Mar. 30, 2005 (JP) ............... 2005-097436

(51) Int. Cl.
*H04N 5/228* (2006.01)
(52) U.S. Cl. .................................. 348/222.1
(58) Field of Classification Search .............. 348/149, 348/208.13, 222.1, 148, 118; 340/936–941, 340/933; 382/103–107; 700/119
See application file for complete search history.

(56) References Cited

U.S. PATENT DOCUMENTS

| | | | |
|---|---|---|---|
| 5,307,136 A * | 4/1994 | Saneyoshi | 356/3.14 |
| 5,381,155 A * | 1/1995 | Gerber | 342/104 |
| 5,554,984 A * | 9/1996 | Shigenaga et al. | 340/937 |
| 5,612,761 A | 3/1997 | Nakata | |
| 5,892,855 A * | 4/1999 | Kakinami et al. | 382/291 |
| 6,111,523 A * | 8/2000 | Mee | 340/937 |
| 7,046,822 B1 * | 5/2006 | Knoeppel et al. | 382/103 |
| 7,251,346 B2 * | 7/2007 | Higaki et al. | 382/106 |
| 2004/0252193 A1 * | 12/2004 | Higgins | 348/149 |

FOREIGN PATENT DOCUMENTS

| | | |
|---|---|---|
| JP | 2-302899 | 12/1990 |
| JP | 4-299277 | 10/1992 |
| JP | 3402263 | 2/2003 |

\* cited by examiner

*Primary Examiner*—Tuan Ho
*Assistant Examiner*—Kent Wang
(74) *Attorney, Agent, or Firm*—Greenblum & Bernstein, P.L.C.

(57) ABSTRACT

An apparatus for photographing a moving object has a velocity detector that measures a velocity of an object, at least one camera that has an image sensor and is located so as to capture the object, an operating processor that calculates a photograph point in accordance with resolution required for an object image, a camera controller that controls the camera on the basis of a detected velocity so as to photograph the object when the object passes the photograph point, and an image transmitting processor that transmits image data, obtained by the camera, outside. The operating processor calculates the photograph point by using an object-resolution conversion diagram. The object-resolution conversion diagram represents a correspondence relationship between an angle of view, a number of pixels, an object distance, and a resolution.

23 Claims, 10 Drawing Sheets

METHOD AND APPARATUS FOR PHOTOGRAPHING MOVING OBJECT

BACKGROUND OF THE INVENTION

1. Field of the Invention

The present invention relates to a photographing system for taking a picture of a moving object, such as a vehicle traveling on a road, especially, it relates to a photographing system that is capable of identifying or specifying a license plate or a make and model of the car, a face of a driver in the car, and so on.

2. Description of the Related Art

Camera systems for detecting or monitoring vehicles on the road, velocity monitoring equipment, which automatically detects a velocity of a moving vehicle and takes a picture of the vehicle, and license-plate reading equipment, which automatically recognizes the character on the license plate, are located on roads and highways, to monitor and regulate vehicles.

In the velocity monitoring equipment, for example, a Doppler radar system utilizing the Doppler-effect, detects a velocity of a moving vehicle, and a photograph of the vehicle is taken by cameras located above the road. Also, in the case of a pulse radar system, a pulsed high-frequency radio-wave is radiated, and the vehicle is photographed by a digital camera. The obtained image data is automatically transmitted to a traffic control center. On the other hand, in the license-plate reading equipment, a cameras takes a picture of a car on a lane in real-time to recognize a number of the license-plate, and the specified car is followed by other cameras located points. The velocity detecting equipment and the license-plate reading equipment are independently developed and are located at different positions.

In general, resolution required for an image depends upon an object to be photographed. For example, the recognition of the driver's face requires relatively high resolution compared to that of a license-plate. Whereas, identifying of the license plate requires higher resolution compared to the resolution required for recognition of the car configuration. Therefore, to always obtain an object image with high-resolution regardless of the object to be photographed, a special camera with a great number of pixels should be located to improve the resolution, so that the amount of image data to be transmitted increases.

SUMMARY OF THE INVENTION

An object of the present invention is to provide an apparatus that is capable of photographing a moving object in accordance with a determined resolution while setting adequate photographing conditions and using a generic or general camera.

An apparatus for photographing a moving object according to the present invention has a velocity detector that measures a velocity of an object, at least one camera that has an image sensor and is located so as to capture the object. Further, the apparatus has an operating processor that calculates a photograph point in accordance with the resolution required for an object image, a camera controller that controls the camera on the basis of a detected velocity so as to photograph the object when the object passes the photographing point, and an image transmitting processor that transmits image data, obtained by camera or photographing operation, outside.

In the present invention, the operating processor calculates the photograph point by using an object-resolution conversion diagram. The object-resolution conversion diagram is available to the detecting system for detecting a moving object such as vehicle, and enables the vehicle detecting system to function as a vehicle monitoring system for monitoring a vehicle traveling over the speed limit, and to function as a license plate reading system. The object-resolution conversion diagram represents a correspondence relationship between an angle of view, a number of pixels, an object distance, and a resolution. For example, the object-resolution conversion diagram exhibits a correspondence relationship between a combination of the angle of view and the number of pixels, and the product of the object distance and the resolution. Further, when using a logarithmic plotting diagram on the basis of the property of the visual perception, in the object-resolution conversion diagram, a linear-relationship between a combination of the angle of view and the number of pixels and the product of the object distance and the resolution, is shown. The logarithmic plotting diagram is similar to a well-known program diagram that is used when calculating the photograph condition, namely, a shutter speed and F number. By utilizing the object-resolution conversion diagram, adequate photograph conditions, namely, the angle of view and the number of pixels, and the object distance are automatically and easily determined in accordance with the resolution.

A vehicle detecting system according to another present invention has a velocity detector that measures a velocity of a vehicle; at least one camera that has an image sensor and is located so as to capture an image of the vehicle; an operating processor that calculates a photograph point by using an object-resolution conversion diagram, in accordance with a resolution required for an image of the vehicle; a specifying processor that specifies a lane in which the vehicle moves, from the plurality of lanes; a camera controller that controls the camera on the basis of a detected velocity so as to photograph the vehicle when the vehicle passes the photograph point; and an image transmitting processor that transmits image data, obtained by the camera, outside.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Hereinafter, the preferred embodiment of the present invention is described with reference to the attached drawings.

Figure 1:
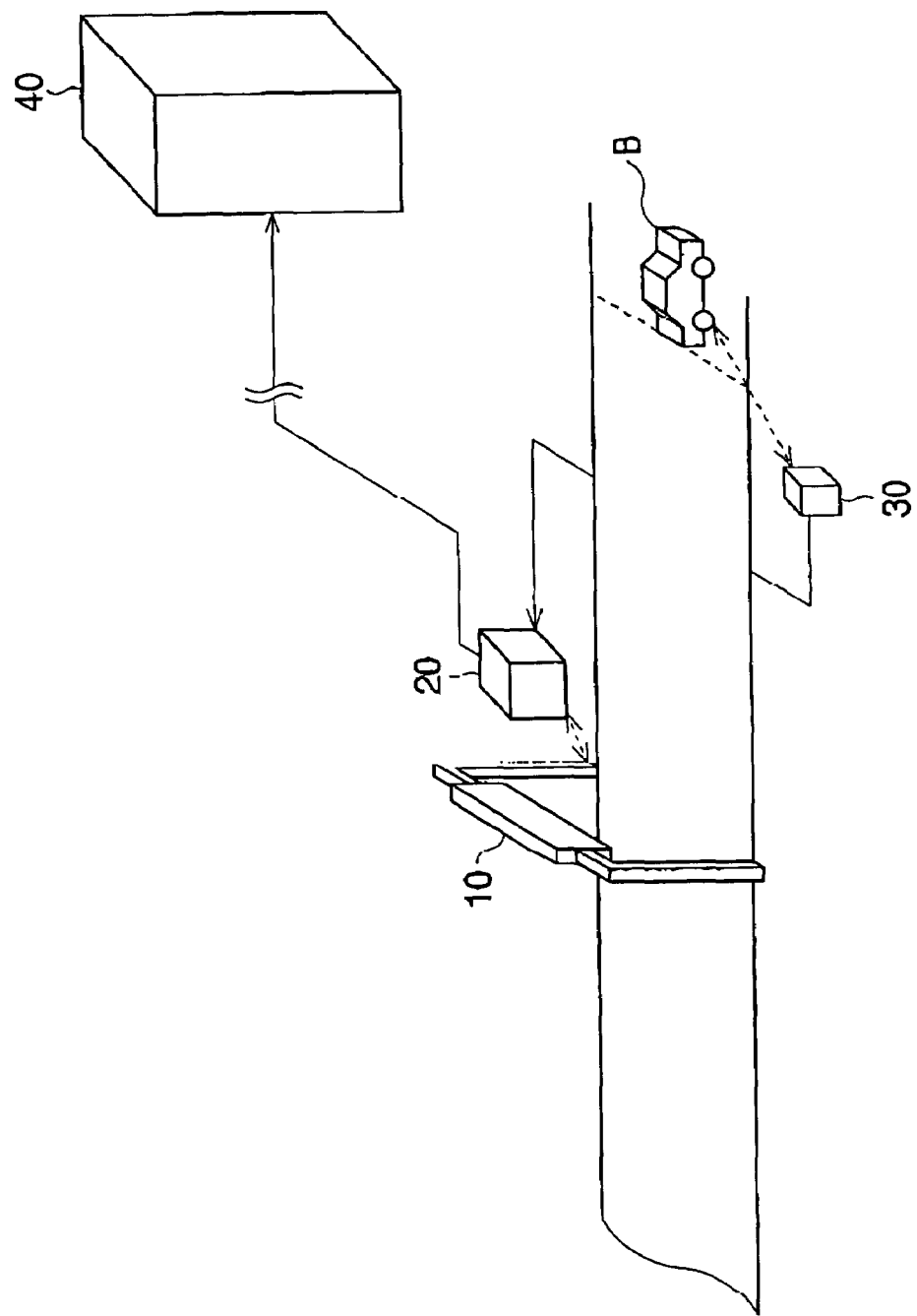
FIG. 1 is a view schematically showing a vehicle detecting system according to a present embodiment.
Figure 2:
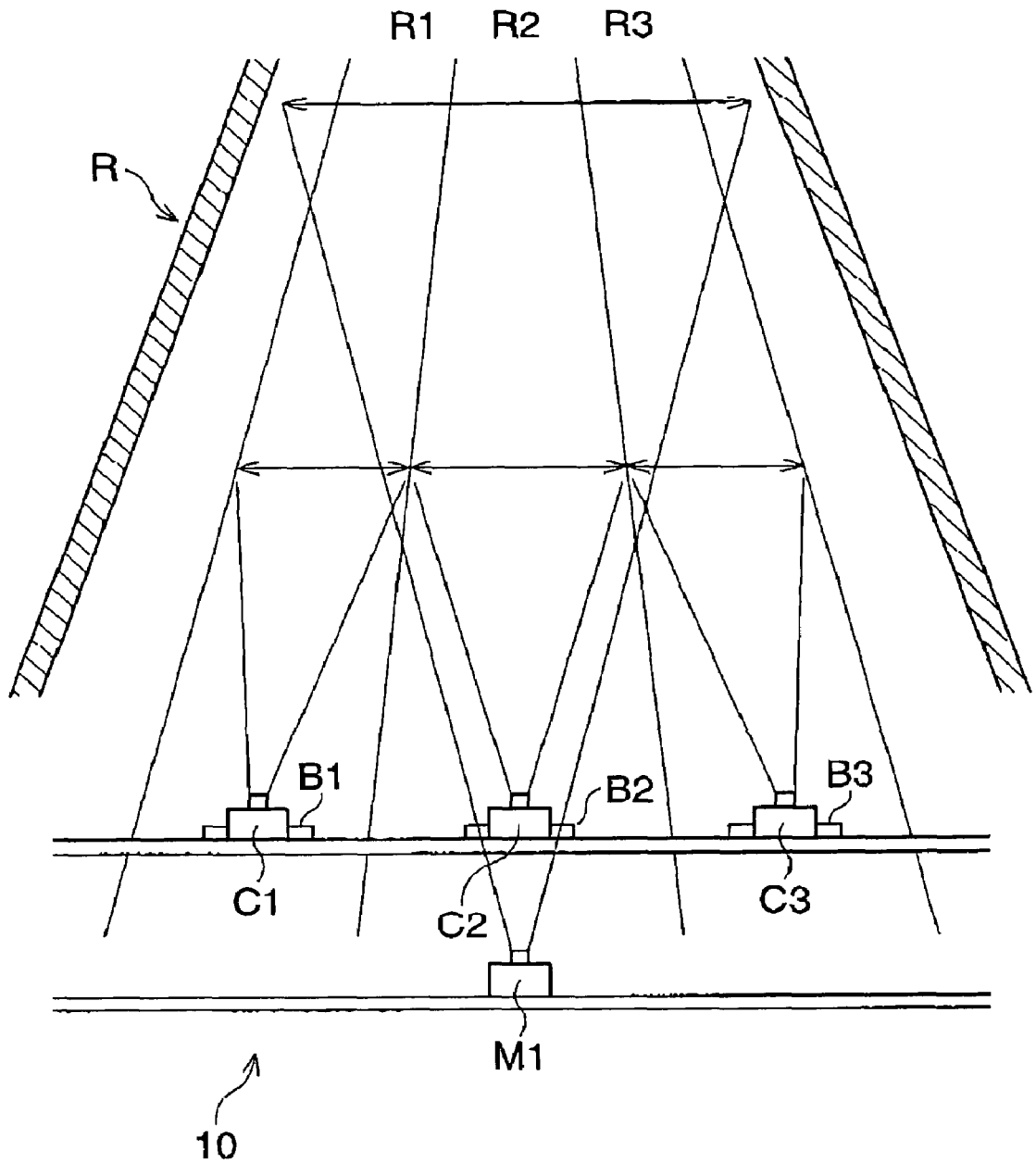
FIG. 2 is a view schematically showing a camera system for photographing a vehicle.

FIG. 1 is a view schematically showing a vehicle detecting system according to a present embodiment. FIG. 2 is a view schematically showing a camera system for photographing a vehicle.

The vehicle detecting system has a camera system 10, a photograph controller 20, and a velocity detector 30, and is located on a road R composed of some lanes such as a highway. The photograph controller 20 is connected to a traffic monitoring center 40 far away from the road R. The velocity detector 30 is a loop-coil type detector using a coil, which is buried in the road R in advance, and detects a velocity of a vehicle "B" by a change of a magnetic field occurring when the vehicle "B" passes the buried coil.

As shown in FIG. 2, the camera system 10 has a wide angle lens camera M1 and three standard or narrow angle lens cameras C1, C2, and C3, each camera is remote-controlled by the photograph controller 20. The wide angle lens camera M1 is capable of taking a picture with a wide angle of view (between approximately 30 degrees and 60 degrees) so as to cover the total of the three lanes R1, R2, and R3. The camera M1 has an image sensor with a great number of pixels (for example, some million pixels). A lens of the camera M1 is oriented to a generally center line of the road R so as to capture a vehicle that is traveling at a point far away from the location of the camera M1, at a distance from approximately 50 m to 100 m. On the other hand, each of the narrow angle lens cameras C1, C2, and C3 has a zooming lens or variable focus telephotographic lens, which is capable of photographing at a given angle of view corresponding to each lane, or the size of a vehicle (herein, angle of view is between approximately 5 degrees and 20 degrees) Each narrow camera has an image sensor with approximately 500,000 pixels.

The wide angle lens camera M1 successively takes a pictures at a given millisecond time-intervals, whereas the narrow angle lens cameras C1, C2, and C3 perform photographing operations for a specific vehicle, which travels at a speed over a regulated speed (hereinafter, referred to as speeding). Lens adjustment mechanisms B1, B2, and B3 are respectively attached to the narrow angle lens cameras C1, C2, and C3 to precisely adjust a direction of the lens. The direction of a lens is adjusted so as to take a picture of a vehicle that just passes a place that is approximately 20 m to 40 m away from the camera system 10.

The velocity detector 30 detects a velocity of a speeding vehicle, and a detecting signal for informing the photograph controller of the speeding is transmitted from the velocity detector 30 to the photograph controller 20. Then, the photograph controller 20 specifies a lane in which the speeding vehicle is traveling, on the basis of image data fed from the wide angle lens camera M1, and controls a corresponding narrow angle lens camera that faces to the specified lane, by remote-control. Image data obtained by the photograph is fed from the narrow angle lens camera to the traffic monitoring center 40 via the photograph controller 20.

Figure 3:
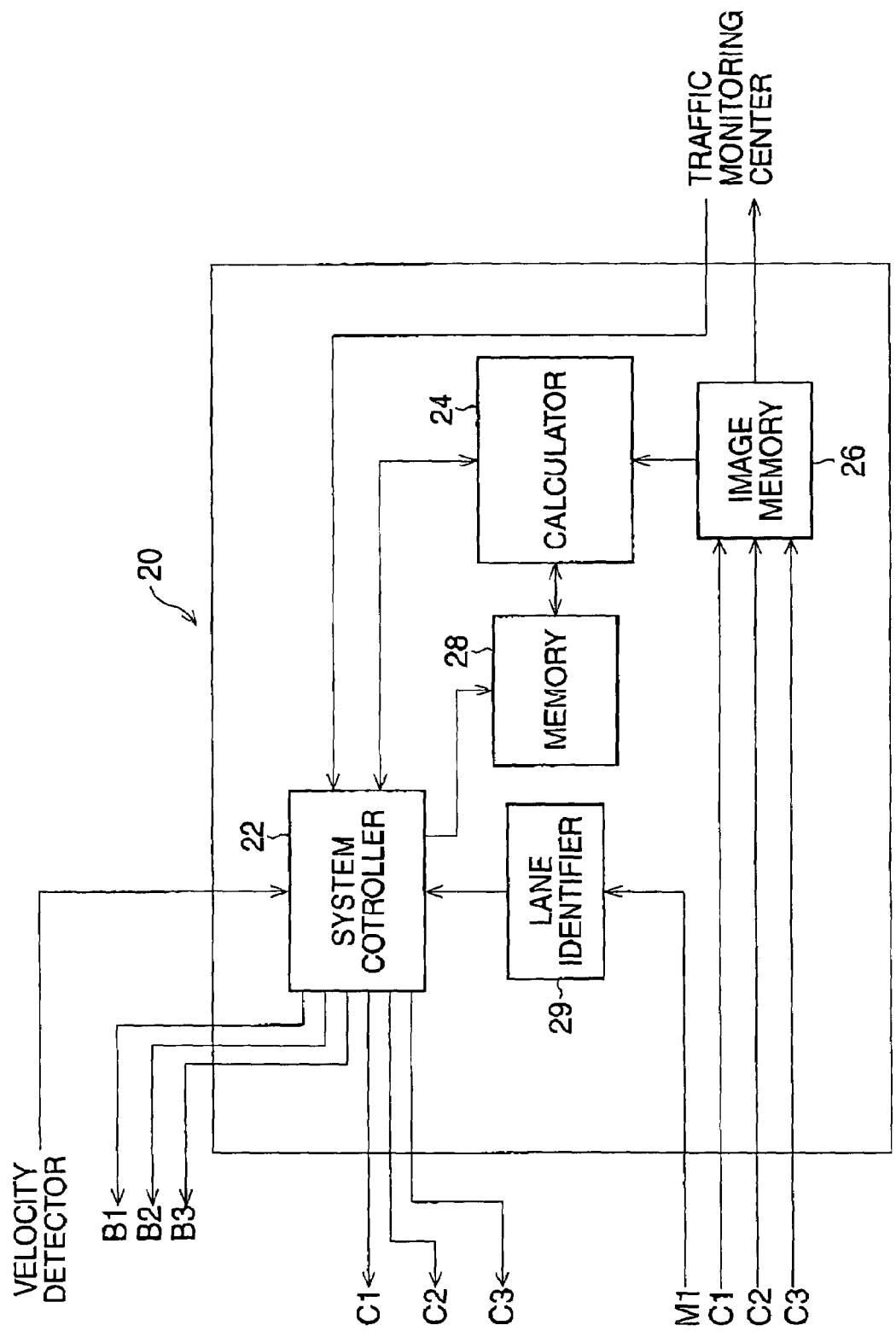
FIG. 3 is a block diagram of the photograph controller 20.

FIG. 3 is a block diagram of the photograph controller 20.

The photograph controller 20 has a system controller 22, a calculator 24, an image memory 26, a memory 28, and a lane identifier 29. The system controller 22 has a ROM (not shown), in which a program for controlling the photographing operation, is stored in advance, and controls the motion of the photograph controller 20. In the lane identifier 29, a lane in which a vehicle travels is automatically specified by using an auto-recognition process, on the basis of a movie image fed from the wide angle lens camera M1. Concretely speaking, based on the movie-image, a vehicle closest to a velocity detecting position is specified as the speeding vehicle and a lane in which the vehicle travels is specified.

In the memory 28, table data associated with an object-resolution conversion-diagram described below, is stored in advance. In the calculator 24, a photograph point of a vehicle to be photographed, in other words, an object distance from the located position of the camera to the photograph point is calculated on the basis of the object-resolution conversion-diagram and a predetermined resolution of an object image. The system controller 22 calculates a shot-timing in accordance with the lane information fed from the lane identifier 29, a velocity data of the vehicle fed from the velocity detector 30, and the calculated photograph point. The system controller 22 feeds control signals for photographing operation to the selected narrow angle lens camera. The selected narrow angle lens camera performs the photograph operation using a given F number and a shutter speed. An image data obtained by the photograph is fed to the image memory 26, and further is fed to the traffic monitoring center 40.

When changing the resolution of an object image, control signals are fed from the traffic monitoring center 40 to the system controller 22. The system controller 22 controls the calculator 24 on the basis of the control signals. In the calculator 24, the photographing conditions are determined in accordance with the changed resolution. When changing the photograph point, control signals are fed from the system controller 22, to the lens adjustment mechanism to modify the direction of the lens.

Figure 4:
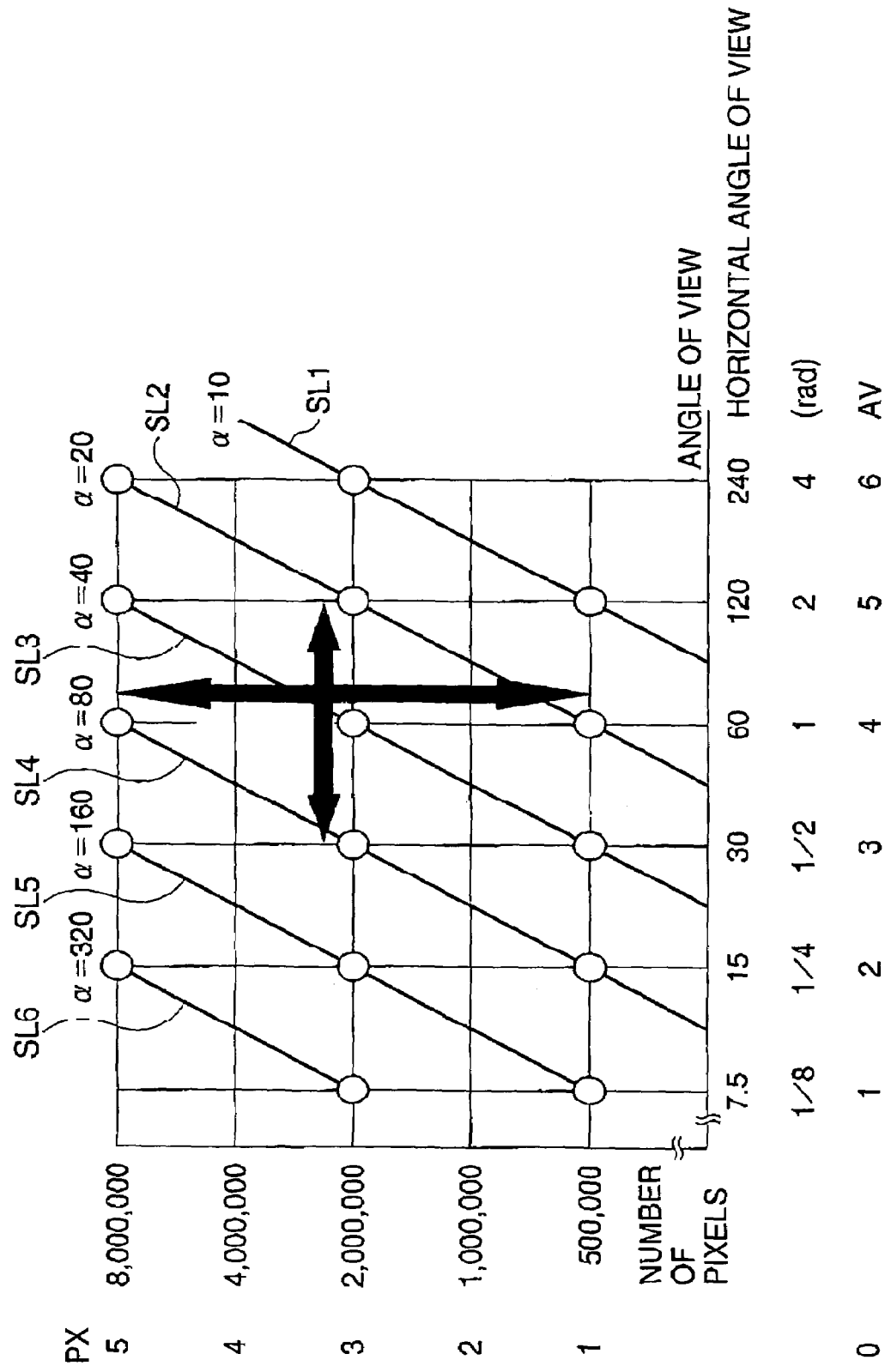
FIG. 4 is an object-resolution conversion diagram.
Figure 5:
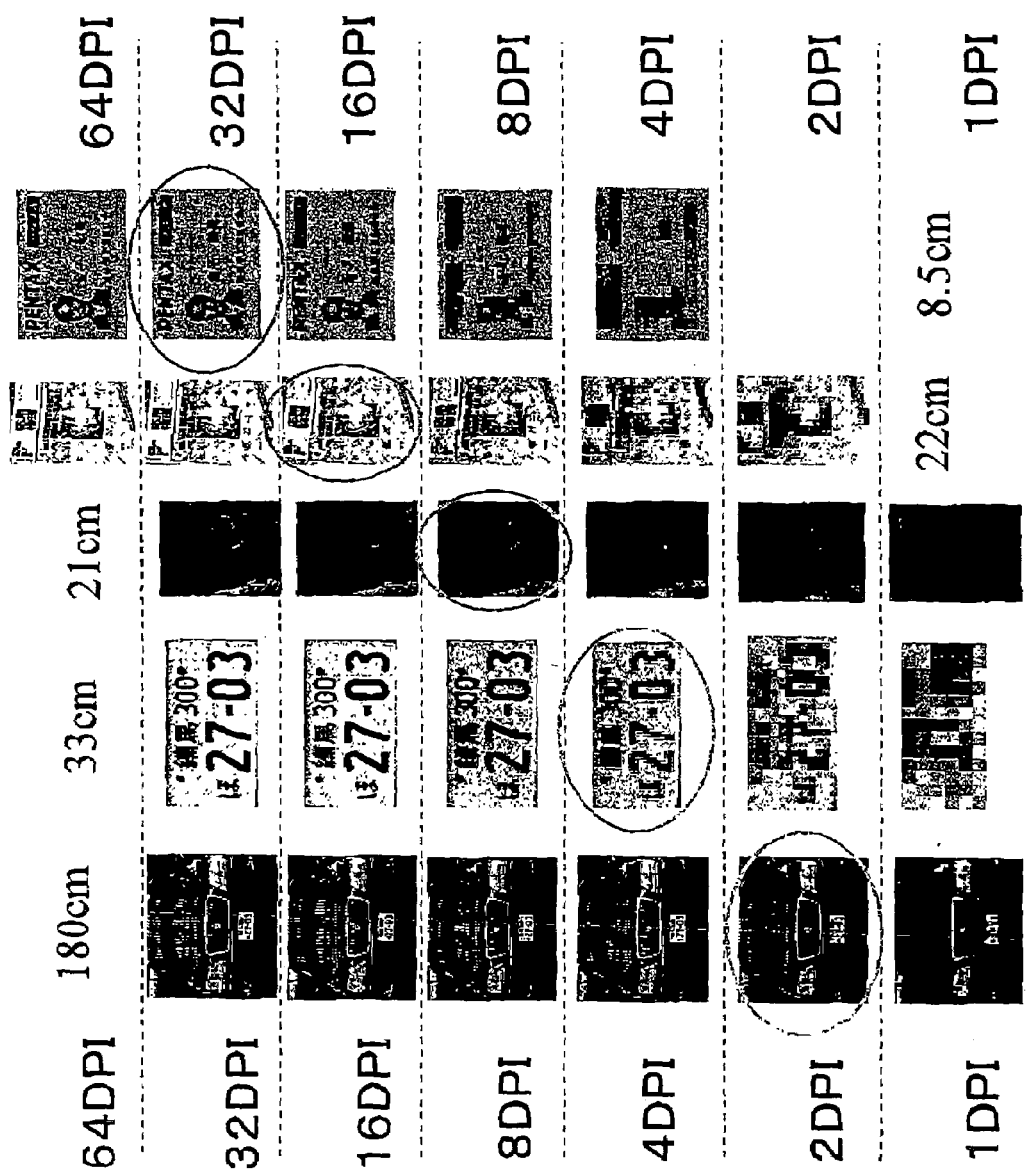
FIG. 5 is a view showing resolution required for an object image.
Figure 6:
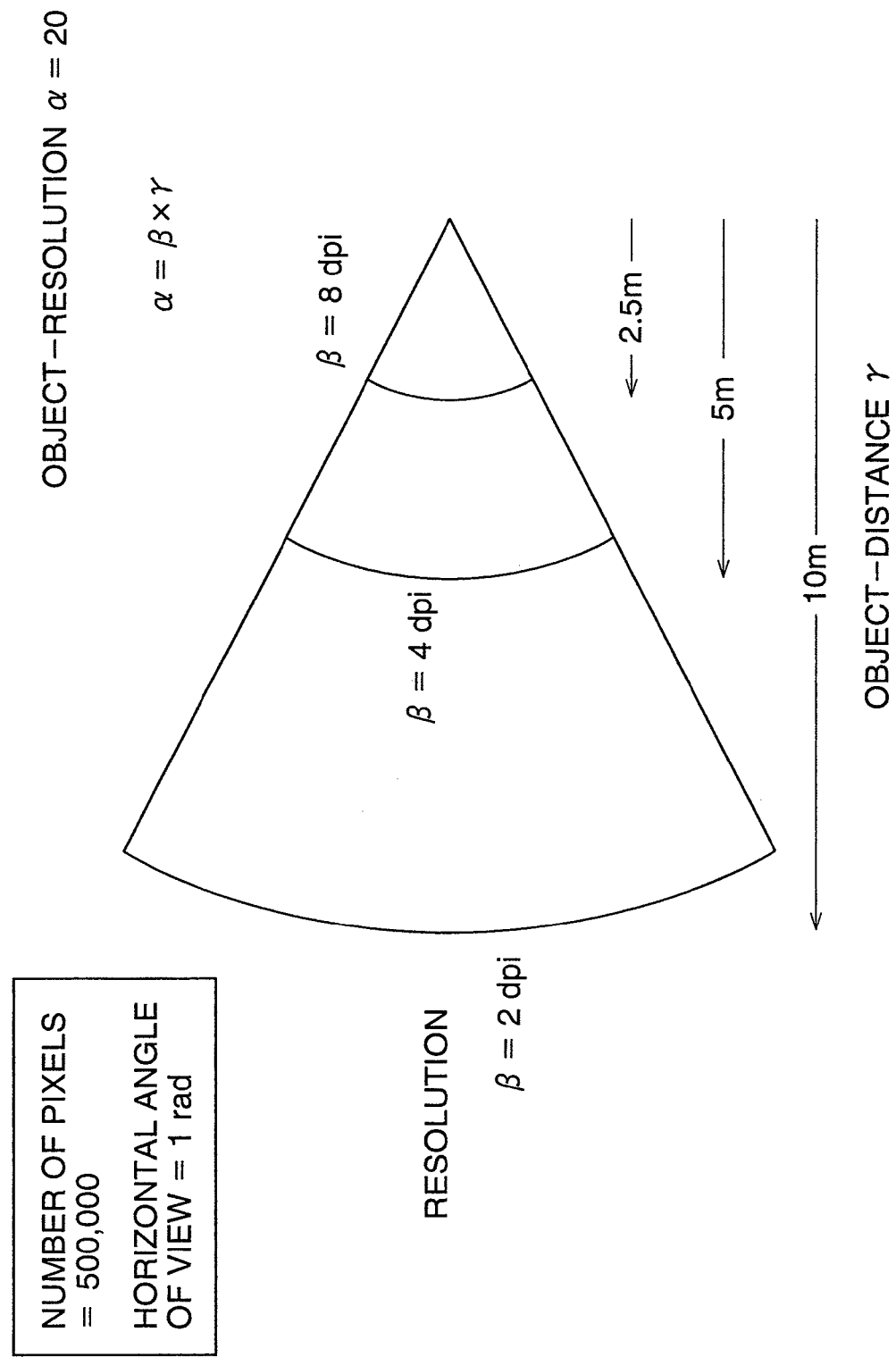
FIG. 6 is a view showing a relationship between resolution and the distance to the object.
Figure 7:
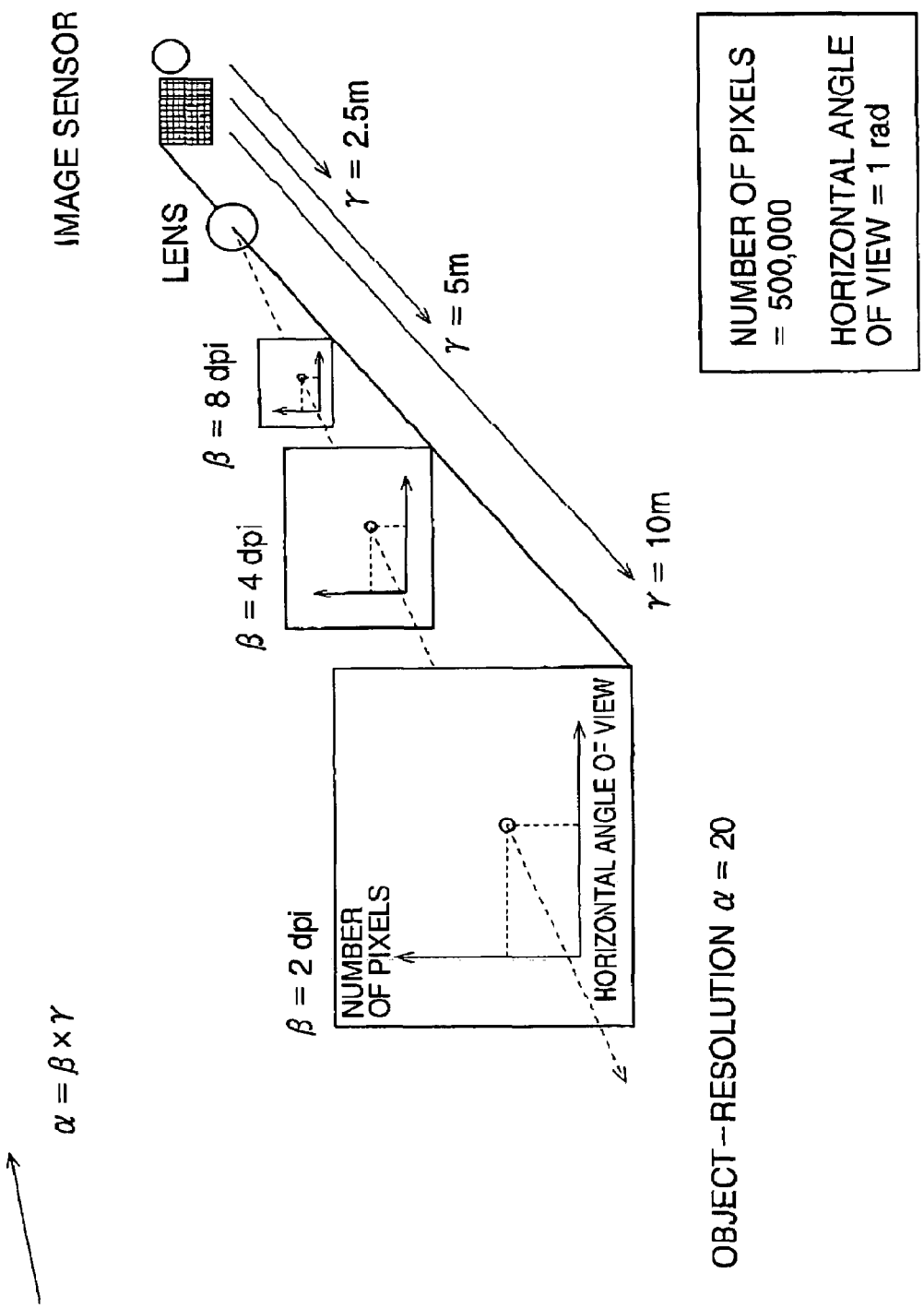
FIG. 7 is a view showing a relationship between the object-resolution and the distance.

FIG. 4 is the object-resolution conversion diagram. FIG. 5 a view showing the resolution required for an object image. FIG. 6 is a view showing a relationship between resolution and the distance to the object. FIG. 7 is a view showing a relationship between the object-resolution and the distance. With reference to FIGS. 4 to 7, the object-resolution conversion diagram that is available as a "program diagram" is explained. Note that, the resolution of the object image obtained in photographing operation is hereinafter represented by "dpi (dot per inch≈25.4 dot/mm)".

FIG. 4 indicates a logarithmic plotting diagram that has a logarithmic scale on the horizontal and vertical axes, and the values of logarithm to base "2" are plotted. The vertical axis represents a number of pixels of an image sensor provided in a camera, while the horizontal axis represents a horizontal angle of view regarding a lens in a camera. As for the horizontal angle of view, 1 radian is set to the standard angle of view, and further approximately one half, one quarter, and one eighth times the standard angle of view and further approximately two and four times the standard angle of view, are defined. The "1 radian" generally corresponds to "60 degrees", the ⅛, ¼, ½, 2, and 4 radians respectively correspond to 7.5, 15, 30, 120, and 240 degrees. On the other hand, as for the number of pixels, 500,000 pixels is set to a standard number of pixels, and two, four, eight, and sixteen times the standard number of pixels (1000,000, 2000,000, 4000,000, and 8000,000 pixels) are defined. Herein, pixel values "PX" (1 to 5) and angle values "AV" (1 to 6), are defined as values of a logarithm along the two-axes, as shown in FIG. 4. The pixel value "PX" increases by 1 as the number of pixels doubles, and the angle value "AV" increases by 1 as the angle of view becomes doubles.

As shown in FIG. 5, the resolution or definition required for the object image obtained by the photographing operation, is different for each photographed object. For example, when specifying a form of the car as the required image, the resolution of "2 dpi" is required, a higher resolution is not needed. On the other hand, when specifying the license number as the required image, the resolution of "4 dpi" is required to recognize the characters. Further, the resolution of 8 dpi is required for identifying the face of the driver, and the resolution of "16 dpi" is required for recognizing small characters.

The resolution of the object image depends upon the number of pixels that forms an object image, the angle of view, and the distance from the camera position to the object. The resolution improves as the number of pixels increases, and similarly the resolution improves as the angle of view becomes narrower. Further, as the distance becomes shorter, the resolution improves.

A variable "α (dpi.m)", which is defined by the following equation, represents the product of the resolution required for the object image and the distance. The variable "α" is herein called an "object-resolution". Note that, the distance is denoted by "γ (m)" and the resolution being different for the object to be photographed, is denoted by "β (dpi)".

$$\alpha = \beta \times \gamma \quad (1)$$

As can be seen from the equation (1), the value of the object-resolution "α" varies with the resolution "β" when the distance "γ" is constant. Also, when the resolution "β" is constant, the value the object-resolution "α" varies with the distance "γ".

The object-resolution conversion diagram shown in FIG. 4 shows the correspondence-relationship between the combination of the angle of view and the number of pixels, and the product of the distance and the resolution. Concretely, the combination of the number of pixels and the angle of view are plotted along straight lines SL1 to SL6 drawn for the object-resolution "α". The standard value of the object-resolution "α" is set to 10, and the slant lines SL1 to SL6 are drawn at constant intervals, in accordance with a multiple of the standard value "10". Concretely, in accordance with the logarithmic values of the angle of view and the number of pixels, the straight lines SL2, SL3, SL4, SL5, and SL6 correspond to twice times (=20), four times (=40), eight times (=80), twelve times (=160), and thirty-two times (320) the standard value "10". The value of the object-resolution "α" is constant for each straight line. When the object exists along the arc-line drawn for the angle of view, the distance "γ" becomes constant along an optional angle of view, since the angle of view is represented by a radian (See FIG. 6). Thus, the lines SL1 to SL6 for which each value of the object-resolution "α" is constant, can be drawn as straight lines.

For the group of straight lines SL1 to SL6, the number of pixels and the angle of view have a linear-relationship and a one-to-one correspondence relationship for each straight line. When the distance "γ" is constant and the resolution "β" is set to a given resolution, the combination of the number of pixels and the angle of view, namely, coordinate values of the pixel values "PX" and the angle values "AV" is determined along the corresponding straight line. When the resolution "β" is changed under the condition that the distance "γ" is constant, the combination of the angle of view and the number of pixels are determined based on another straight line.

For example, when the distance "γ" is set to 10 m, the number of pixels is 500,000 (the pixel value PX=1), and the horizontal angle of view is 1 radian (the angle value AV=1), the object-resolution "α" becomes 20, as can be from FIG. 4. Therefore, based on the equation (1), the object image with the "2 dpi" resolution is obtained by the photographing operation. Various combinations of the angle of view and the number of pixels, which can form an object image with resolution "2 dpi", can be determined on the straight line SL2. Note that, since the camera does not have an f-θ lens and the width of the object is very small compared to the distance "γ", the angle of view shown in FIG. 6 can be represented by "degree" instead of "radians".

On the other hand, when the distance "γ" is constant, and the value of the resolution "β" is changed, the combination of the angel of view and the number of pixels is determined along another straight line. For example, when the distance "γ" is 10 m and the resolution "β" is set to 4 dpi, the combination of the angle of view and the number of pixels is determined on the straight line SL3 corresponding to the object-resolution "α"=40. Further, as shown in FIGS. 6 and 7, when the object-resolution "α" is set to a given value, the resolution "β" varies with the distance "γ".

In this embodiment, based on the object-resolution conversion diagram and equation (1), the photograph point, namely, the object distance "γ" is determined in accordance with the resolution "β" required for the object image. Further, when the resolution "β" is changed, the distance "γ", the angle of view, and the number of pixels, which correspond to the changed resolution "β", are determined on the basis of the object-resolution conversion diagram and the equation (1). At this time, the angle of view and/or the number of pixels are changed so as to meet a condition regarding the object distance "γ". For example, when the calculated distance "γ" is too short to capture the speeding vehicle, the angle of view and/or the number of pixels are changed in accordance with the diagram, so as to meet the resolution required for the object image.

Figure 8:
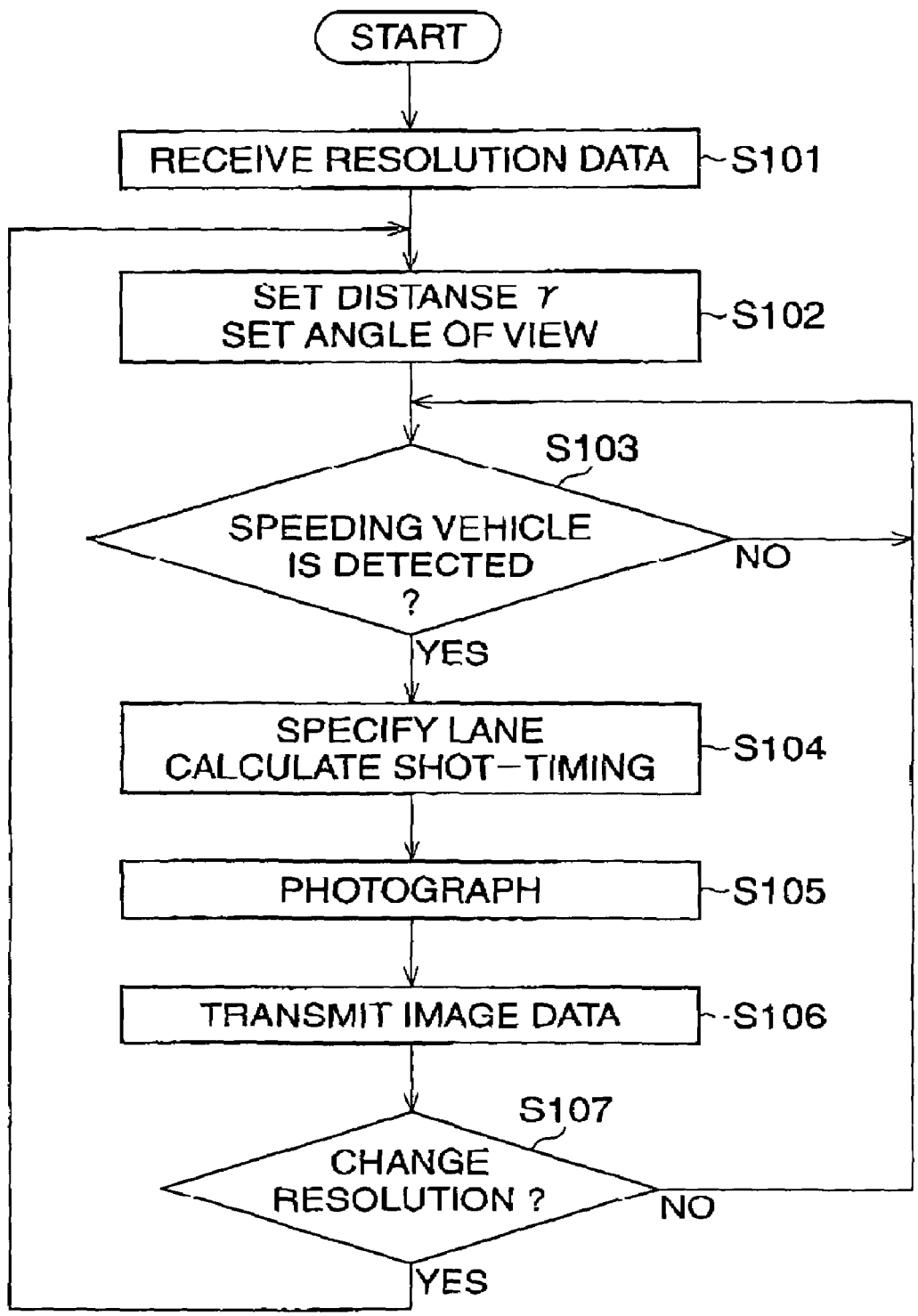
FIG. 8 is a flowchart of a photograph control process performed by the photograph controller.
Figure 9:
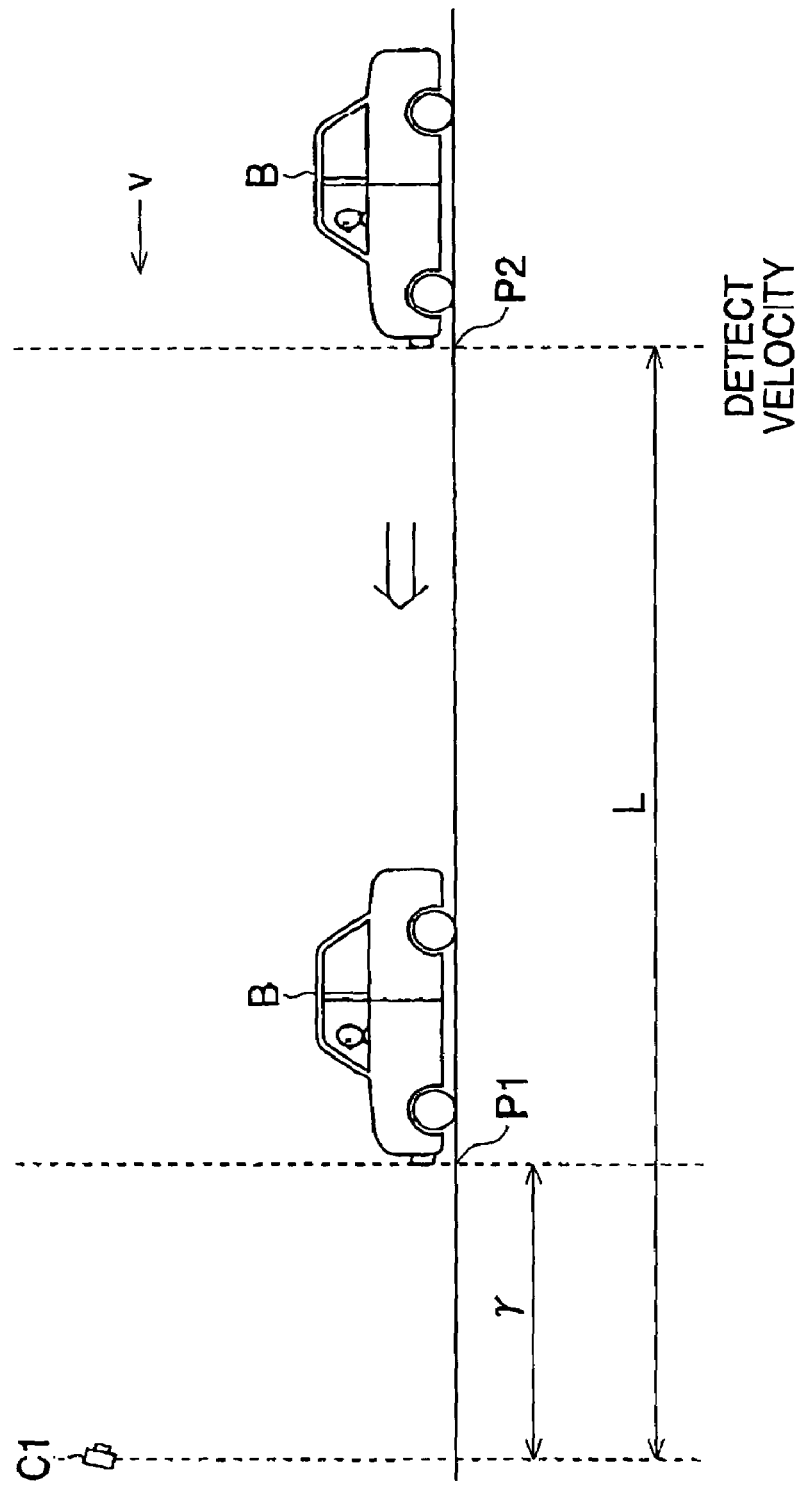
FIG. 9 is a view showing a relationship between the vehicle and the camera position.
Figure 10:
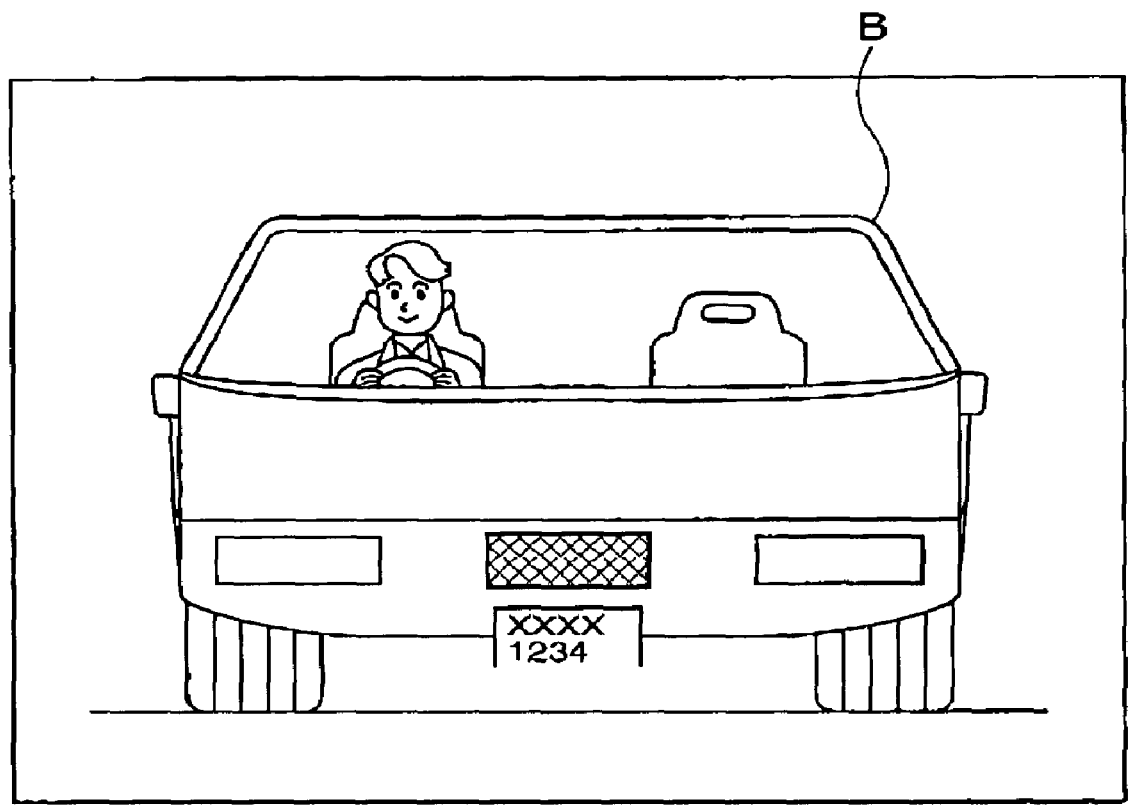
FIG. 10 is a view showing a photographed still image.

FIG. 8 is a flowchart of the photograph control process performed by the photograph controller 20. FIG. 9 is a view showing a relationship between the vehicle and the camera position. FIG. 10 is a view showing a photographed still image.

In Step S101, data associated with the resolution "β", which is fed from the traffic monitoring center 40, is input to the system controller 22. When monitoring a speeding vehicle, the resolution "β" is set to 8 dpi. On the other hand, when monitoring a traffic jam, the resolution "β" is set to 4 dpi. Herein, the resolution "8 dpi" is required to specify the vehicle configuration and the license plate. In Step S102, the photograph point, namely, the distance "γ" from the camera to the vehicle is calculated on the basis of equation (1) and the object-resolution conversion diagram shown in FIG. 4. Concretely speaking, the distance "γ" is obtained by the resolution "β" and the object resolution "α", which is derived from the number of pixels in the narrow angle lens cameras C1, C2, and C3 and the horizontal angle of view of the cameras C1, C2, and C3. Herein, the angle of view is preset to 7.5 degrees and the number of pixels is approximately 500,000 pixels, therefore, the object-resolution "α" is "160" as can be seen from the object-resolution conversion diagram shown in FIG. 4. Then, the distance, "γ" is set to 20 m based on equation (1). After that, control signals for operating the lens adjustment mechanism are output to the corresponding narrow angle lens camera in accordance with the calculated distance "γ".

In Step S103, it is determined whether a speeding vehicle "B" has been detected by the velocity detector 30. Herein, velocity data is fed from the velocity detector 30 to the photograph controller 20 when the vehicle "B" runs at more than the velocity of "40 m/s". When it is determined that a speeding vehicle "B" has not been detected by the velocity detector 30, Step S103 is repeatedly performed. On the other hand, when it is determined that a speeding vehicle "B" has been detected, the process goes to Step S104. In Step S104, a lane in which the speeding vehicle "B" is located is specified, on the basis of the image data fed from the wide angle lens camera M1. Then, the photograph timing or shot timing is calculated.

An shown in FIG. 9, a velocity detecting position P2, wherein the velocity detector 30 detects the velocity of vehicle "B", is determined in advance. A distance between the position of the camera system 10 and the velocity detecting position P2 is herein designated by "L". Note, in FIG. 9, the vehicle runs in the lane L1. Based on the distance "γ" from the camera's located position to the photograph point P1, the velocity detecting position P2, and the detected velocity of the vehicle "B", a time "Δt", for which the vehicle moves from the positions P2 to P1, is calculated by the following equation.

$$\Delta t = (L-\gamma)/v \quad (2)$$

The shot-timing is set such that the photographing operation is performed when the time "Δt" passes after the detection of the speeding vehicle B. Note that, considering that the interval between the positions P1 and P2 is extremely short, it is deemed that the vehicle B runs at a substantially constant velocity between the positions P1 and P2.

In Step S105, control signals are output to the selected camera such that the photographing operation is performed when the time "Δt" passes, after the vehicle 6 passes the point P2. Consequently, a still image of the vehicle B is obtained, as shown in FIG. 10. As the resolution "β" is set to "4 dpi", the number of the license plate can be recognized in the obtained still image. In Step S106, image data is temporarily stored in the image memory 26, and is then fed to the traffic monitoring center 40.

In Step S107, it is determined whether command data for changing the resolution has been fed from the traffic monitoring center 40 to the photograph controller 22. When it is determined that the command data for changing the resolution has not been fed from the traffic monitoring center 40, the process returns to Step S103. On the other hand, when it is determined that the command data has been fed from the traffic monitoring center 40, the process returns to Step S102 wherein the distance "γ" is calculated on the basis of the changed resolution "β".

For example, when the resolution "β" is firstly set to 4 dpi in a situation that the angle of view is 15 degrees, and the resolution "β" is then changed from 4 dpi to 8 dpi, the distance "γ" is changed from 20 m to 10 m in accordance with equation (1). However, since the distance "γ" is herein restricted between 20 m and 40 m, the horizontal angle of view is changed from 15 degrees to 7.5 degrees. Namely, a focal length of the camera becomes long so as to zoom in the vehicle.

Note that, when the angle of view is preset to 7.5 degrees, the object-resolution "α" is set to 160 on the basis of the object-resolution diagram. The distance "γ" is set to 40 m when the resolution "β" is 4 dpi, the distance "γ" is set to 20 m when the resolution "β" is 8 dpi.

In this way, in the present embodiment, the photograph point P1 or the object distance "γ" is calculated on the basis of the determined resolution "β", the object-resolution conversion diagram shown in FIG. 4, and equation (1). When the speeding vehicle "B" is detected by the velocity detector 30, the short-timing is calculated on the basis of equation (2). Further, the lane in which the vehicle "B" runs is specified by using the wide angle lens camera M1. Then, the corresponding narrow angle lens camera is controlled so as to perform the photographing operation when the vehicle "B" passes the photograph point P1, and image data obtained by the photographing operation is fed to the traffic monitoring center 40.

To read the license plates regarding all of the vehicles for all lanes such as license plate reading equipment, the photograph controller may successively take pictures at a given time-interval (for example, from 10 to 40 millisecond intervals). For example, when the angle of view is set to 15 degrees, the resolution is set to 4 dpi, and the object-resolution "α" s determined to be 80 by the diagram shown in FIG. 4, the distance "γ" is set to 20 m. Then, the velocity of each vehicle is detected, the shot-timing is calculated, and the photographing operation is performed.

The photographing operation may be performed while changing the number of pixels. For example, all of the pixels are used when specifying the driver of the speeding vehicle, whereas some of the pixels are used by performing sampling process, when specifying only a license plate.

The values of the object-resolution "α", the number of pixels, the angle of view, the resolution "β", and the distance "γ" are not restricted to the values shown in FIG. 4, other values may be set, and other orders maybe applied, for example, radians may be used in a condition where an f-θ lens is used.

The object-resolution conversion diagram may be represented by a logarithm function having a baas other than 2. The angle of view may be set without using a zoom lens, for example, a photographing optical system with a plurality of focus points may be used.

A radar type velocity detector may be applied instead of the loop-coil type detector. The lane in which the vehicle runs may be specified without the wide angle lens camera. The vehicle detecting system may be located on a one lane road. A movie camera may be applied instead of the still camera.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No.2005-097436 (filed on Mar. 30, 2005), which is expressly incorporated herein, by reference, in its entirety.

The invention claimed is:

1. An apparatus for photographing a moving object comprising:
   a velocity detector that measures a velocity of an object;
   at least one camera that has an image sensor and is located so as to capture an image of the object;
   an operating processor that calculates a photograph point by using an object-resolution conversion diagram, in accordance with a resolution required for an object image;
   a camera controller that controls said camera on the basis of a detected velocity so as to photograph the object when the object passes the photograph point; and
   an image transmitting processor that transmits image data, obtained by said camera, outside,
   wherein the object-resolution conversion diagram represents a correspondence relationship between an angle of view, a number of pixels, an object distance, and a resolution.

2. The apparatus of claim 1, wherein said operating processor calculates the photograph point for a moving object that travels at a velocity more than a predetermined velocity, said photograph controller photographing the moving object.

3. The apparatus of claim 1, wherein said photograph controller controls said camera so as to successively photograph a series of objects that passes the photograph point in order.

4. The apparatus of claim 1, wherein said operating processor changes at least one of the photograph point, the angle of view of said camera, and the number of pixels used, by using the object-resolution conversion diagram, in accordance with a change of the required resolution.

5. The apparatus of claim 1, wherein said operating processor changes the photograph point by using the object-resolution conversion diagram, in accordance with a change of the required resolution.

6. The apparatus of claim 1, wherein said operating processor changes the angle of view of said camera by using the object-resolution conversion diagram, in accordance with a change of the required resolution.

7. The apparatus of claim 1, wherein said operating processor changes the number of pixels used by using the object-resolution conversion diagram, in accordance with a change of the required resolution.

8. The apparatus of claim 1, wherein a plurality of recording cameras are located along a plurality of lanes in which the object moves,
wherein said operating processor has a specifying processor that specifies a lane in which the object moves from the plurality of lanes, said photograph controller controlling a recording camera corresponding to the specified lane.

9. The apparatus of claim 8, wherein a vehicle specifying camera is located so as to capture the total of the plurality of lanes, and said specifying processor specifies the lane on the basis of image data obtained by said vehicle specifying camera.

10. The apparatus of claim 9, an angle of view of said vehicle specifying camera is broad compared to an angle of view of said recording camera.

11. The apparatus of claim 1, wherein said operating processor operates the photograph point on the basis of the resolution and a number of pixels.

12. The apparatus of claim 1, wherein said camera has a zooming lens.

13. The apparatus of claim 1, wherein said camera is a still camera.

14. The apparatus of claim 1, wherein the object-resolution conversion diagram exhibits a correspondence relationship between a combination of the angle of view and the number of pixels, and the product of the object distance and the resolution.

15. The apparatus of claim 1, wherein the object-resolution conversion diagram exhibits a linear-relationship between a combination of the angle of view and the number of pixels and the product of the object distance and the resolution.

16. A method for photographing a moving object comprising:
measuring a velocity of an object;
calculating a photograph point by using an object-resolution conversion diagram, in accordance with a resolution required for an object image;
controlling at least one camera on the basis of a detected velocity so as to photograph the object when the object passes the photograph point, said camera having an image sensor and being located so as to capture an image of the object; and
transmitting the image data, obtained by said camera, outside wherein the object-resolution conversion diagram represents a correspondence relationship between an angle of view, a number of pixels, an object distance, and a resolution.

17. An apparatus for controlling a photograph of a moving object comprising:
an operating processor that calculates a photograph point by using an object-resolution conversion diagram, in accordance with a resolution required for an object image; and
a camera controller that controls at least one camera on the basis of a detected velocity of the moving object so as to photograph the object when the object passes the photograph point, said camera having an image sensor and being located so as to capture an image of the object,
wherein the object-resolution conversion diagram represents a correspondence relationship between an angle of view, a number of pixels, an object distance, and a resolution.

18. A method for controlling a photograph of a moving object comprising:
calculating a photograph point by using an object-resolution conversion diagram, in accordance with a resolution required for an object image; and
controlling at least one camera on the basis of a detected velocity of the moving object so as to photograph the object when the object passes the photograph point, said camera having image sensor and being located so as to capture an image of the object,
wherein the object-resolution conversion diagram represents a correspondence relationship between an angle of view, a number of pixels, an object distance, and a resolution.

19. A computer readable medium that stores a program for photographing a moving object, comprising:
a calculating code segment for calculating a photograph point by using an object-resolution conversion diagram, in accordance with a resolution required for an object image; and
a controlling code segment for controlling at least one camera on the basis of a detected velocity of the moving object so as to photograph the object when the object passes the photograph point, said camera having an image sensor and being located so as to capture an image of the object,
wherein the object-resolution conversion diagram represents a correspondence relationship between an angle of view, a number of pixels, an object distance, and a resolution.

20. A computer-readable medium encoded with a computer program product for photographing a moving object, comprising:
an operating processor that calculates a photograph point by using an object-resolution conversion diagram, in accordance with a resolution required for an object image; and
a camera controller that controls at least one camera on the basis of a detected velocity of the moving object so as to photograph the object when the object passes the photograph point, said camera having an image sensor and being located so as to capture an image of the object,
wherein the object-resolution conversion diagram represents a correspondence relationship between an angle of view, a number of pixels, an object distance, and a resolution.

21. A vehicle detecting system comprising:
a velocity detector that measures a velocity of a vehicle;

at least one camera that has an image sensor and is located so as to capture an image of the vehicle;

an operating processor that calculates a photograph point by using an object-resolution conversion diagram, in accordance with a resolution required for an image of the vehicle;

a specifying processor that specifies a lane in which the vehicle moves, from the plurality of lanes;

a camera controller that controls said camera on the basis of a detected velocity so as to photograph the vehicle when the vehicle passes the photograph point; and an image transmitting processor that transmits image data, obtained by said camera, outside, wherein the object-resolution conversion diagram represents a correspondence relationship between an angle of view, a number of pixels, an object distance, and a resolution.

22. A method for detecting vehicle comprising:

measuring a velocity of a vehicle;

calculating a photograph point by using an object-resolution conversion diagram, in accordance with a resolution required for an image of the vehicle;

specifying a lane in which the vehicle moves, from the plurality of lanes;

controlling at least one camera on the basis of a detected velocity so as to photograph the vehicle when the vehicle passes the photograph point, said camera having an image sensor and being located so as to capture an image of the object; and an image transmitting processor that transmits image data, obtained by said camera, outside, wherein the object-resolution conversion diagram represents a correspondence relationship between an angle of view, a number of pixels, an object distance, and a resolution.

23. A method for photographing a moving object comprising:

measuring a velocity of an object;

carrying out a first photograph operation by a first angle of view when a velocity of the vehicle exceeds a given velocity;

operating a photograph point on the basis of a detected velocity, an image obtained by the first photograph operation, and an object-resolution conversion diagram; and carrying out a second photograph operation by a second angle of view that is narrow compared to the first angle of view when the vehicle passes the photograph point, wherein the object-resolution conversion diagram represents a correspondence relationship between an angle of view, a number of pixels, an object distance, and a resolution.

* * * * *